Jan. 17, 1950 M. P. WILDER ET AL 2,495,042

TWO-SIDED MOSAIC AND METHOD OF MANUFACTURING SAME

Filed Nov. 12, 1947 3 Sheets-Sheet 1

INVENTORS.
MARSHALL P. WILDER
ARTHUR J. STEVENS
BY Thomas S. Ross
ATTORNEY.

Jan. 17, 1950 M. P. WILDER ET AL 2,495,042

TWO-SIDED MOSAIC AND METHOD OF MANUFACTURING SAME

Filed Nov. 12, 1947 3 Sheets-Sheet 2

INVENTORS.
MARSHALL P. WILDER
ARTHUR J. STEVENS
BY Thomas S. Ross
ATTORNEY

INVENTORS.
MARSHALL P. WILDER
ARTHUR J. STEVENS
BY Thomas S. Ross
ATTORNEY

Patented Jan. 17, 1950 2,495,042

UNITED STATES PATENT OFFICE 2,495,042

TWO-SIDED MOSAIC AND METHOD OF MANUFACTURING SAME

Marshall P. Wilder, Stamford, Conn., and Arthur J. Stevens, Holliston, Mass., assignors to Remington Rand Inc., New York, N. Y., a corporation of Delaware Application November 12, 1947, Serial No. 785,308

9 Claims. (Cl. 250—167)

This invention relates to certain new and useful improvements in a two-sided mosaic of the type which may be used advantageously in a television pickup tube of the electron image type, and to the novel method or procedure used in the manufacture of the mosaic.

The image orthicon type of tube is known for its great sensitivity to light enabling television pictures to be picked up at very low illumination levels.

In the image orthicon type of pickup tube, the optical image is formed on a screen mounted at the front end which emits electrons from each elemental area in proportion to the light falling on that area, i. e., it acts as a photocathode. These streams of electrons are attracted toward and focused on a second screen by an electrostatic or magnetic field or a combination of both. As the electrons strike the front of the second screen each elemental area in a unit of time produces secondary emission in proportion to the electrons falling upon it. This leaves the elemental area deficient in electrons, i. e., positively charged. This positive charge is conducted through to the back of the screen. The back of the screen is scanned by an electron beam. The scanning beam supplies sufficient electrons in this interval of time to make up the deficiency in electrons of each elemental area. The rest of the electrons approaching a particular elemental area while the beam is crossing it are reflected back to the collector plates mounted about the electron gun structure. These collector plates may be designed to form an electron multiplier to generate sufficient signal to drive an amplifier stage.

Methods have been used to obtain isolation of 150 elements to the inch in a two-sided mosaic. This is usually done with a mesh of wires. The present method involves piercing a thousand holes .0005 inch in diameter in each linear inch of a sheet of copper or other conductive material about .001 in thickness, mounting it in a large frame and coating the walls of the holes with an insulator such as calcium fluoride and filling the remainder of the holes with colloidal graphite to form plugs of conducting material isolated from each other and from the screen. With this arrangement there is practically no leakage before the charge is neutralized through the conducting plugs by the scanning beam as the neutralization is almost instantaneous.

The two-sided mosaic screen of the present invention is strong enough to support its own weight and not fracture after being mounted in a vacuum tube and subjected to normal handling; has increased picture elements per unit area, which feature materially increases the definition of the television picture; and will answer all requirements of a vacuum tube part.

The instant invention further provides a two-sided mosaic having increased efficiency; increased quantity of charge acquired by the mosaic per unit light flux on the photocathode; improved secondary emission of the mosaic surface; prevention of spurious signals due to random redistribution of the secondary electrons; one which is highly effective in its operation; and one having characteristics which include among others, high definition; long persistence at low light levels; short persistance at high light levels; and reduced saturation during extremely high light levels.

Figs. 8 to 13 inclusive are highly magnified fragmentary sectional views illustrating the steps used in manufacturing the improved two-sided mosaic.

Figure 1:
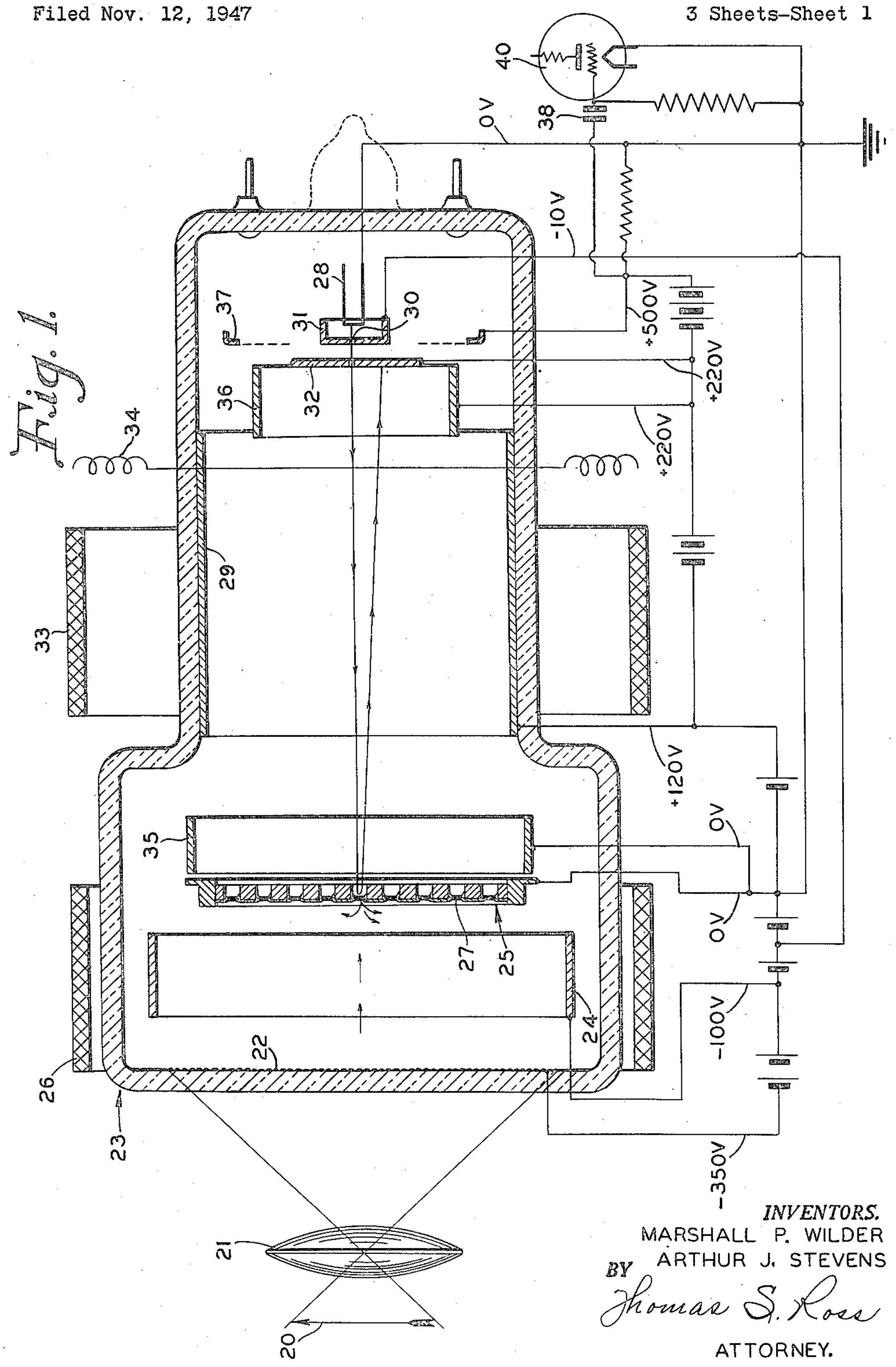
Fig. 1 is a schematic diagram of the electron image tube and associated circuits.

In Fig. 1 light from the object 20 is projected by the lens 21 upon the photocathode 22 mounted inside of the front face of the tube envelope 23. The electrons emitted from the screen 22 are propelled by the potential on the photocathode ring 24 towards the target screen 25. They are retained in proper alignment by the focusing coil 26 mounted about the enlarged front end of the glass envelope 23. As the electrons strike the plugs 27, mounted in the screen 25, they cause secondary electrons to be emitted, leaving these plugs with a deficiency of electrons, i. e., positively charged, proportional to the amount of light falling on the equivalent portion of the photocathode 22. At the same time electrons are being emitted by the cathode 28 through the opening 30 in the grid 31 and are accelerated and defined as to cross-section by a hole approximately two thousandths of an inch in diameter in the second grid 32 which is at about the potential of the wall coating 29 and strike the rear of the plugs 27 in the screen 25. The stream of electrons is focused by the focus coil 33 and deflected horizontally by the coil 34 and vertically by another similar set of coils not shown. Upon approaching the screen 25, the electrons are decelerated by an electrode 35 at ground potential in the neighborhood of the screen 25. As many of the electrons in the beam approaching the plug 27, during the time that the beam is passing over that particular plug, as are needed to neutralize the positive charge, are attracted to the plug. The remaining electrons in the beam are then attracted back by the wall coating 29 towards the first multiplier electrode 32 through the pursuader electrode 36. Upon striking the first multiplier 32, a secondary emission effect takes place and more electrons strike the second multiplier electrodes 37. This action may be repeated as often as desired to obtain the required signal strength. The output is taken from the last multiplier and coupled through a capacitor 38 to an amplifier 40 and the other equipment required for a television apparatus. The voltages shown in the diagram are merely relative, not absolute.

This invention concerns itself primarily with the construction of the screen 25. This screen is essentially a two-sided mosaic providing many plugs of secondary emissive conducting material, each electrically insulated from the others. The more such plugs to a square inch, the greater the picture information detail obtained. The aim has been to obtain approximately a thousand such plugs to the linear inch compared to prior screens having 150 to 200 conducting elements to the linear inch. Certain serious manufacturing problems and difficulties are encountered in achieving this result.

The first problem which presents itself in the manufacture of such a mosaic, is the manner in which the perforations or interstices are formed in the screen. Secondly, the insulating material used for coating the screen must be able to withstand the high temperatures to which it is subjected during baking requirements for the outgassing of the cathode ray tube in which it is mounted during exhaust of the tube. Furthermore, the insulating coating must adhere to the screen without danger of cracking or flaking off, and great care must be exercised to avoid cracks, chips, and other openings in the insulation, if generation of spurious signals is to be prevented.

It is highly desirable that at least 50% of the screen be open area, and when using one thousand perforations per inch, it will be readily apparent that the diameter of each perforation or aperture will measure approximately .0005. Thus, the problem of inserting plugs, formed of conductive material, within these apertures to serve as the picture elements, and insulating the plugs from the screen and from each other, presents a third problem which has been successfully solved by our improved method of manufacture.

*Screen*

Figure 2:
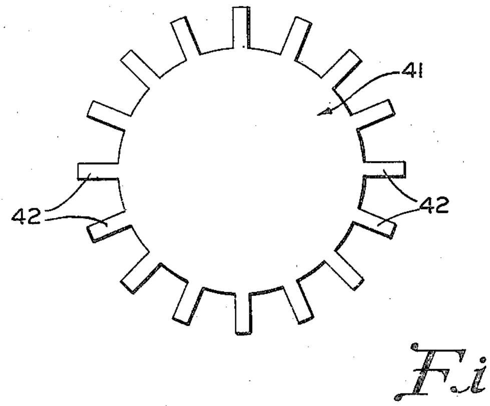
Fig. 2 is a plan view of a metallic blank for the screen before it is pierced with minute equally spaced holes.

Referring now to the drawings of the screen in detail, and for the present to Fig. 2, reference numeral 41 indicates the blank from which the screen 25 is made. This blank is preferably formed from a thin metallic sheet of metal, such as copper or the like, having a thickness of approximately .001", and comprises a circular or disk-like body having tabs 42 integrally formed therewith which extend radially from the peripheral edge of the body. These tabs are used in mounting the screen to its carrier in a manner presently disclosed.

Figure 3:
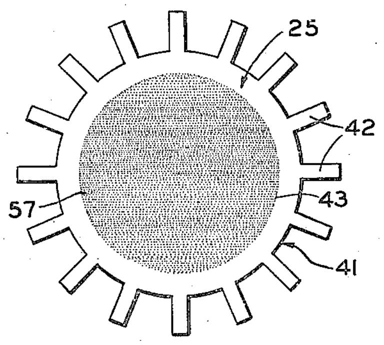
Fig. 3 is a plan view similar to Fig. 2 after the perforations are formed in the blank.
Figure 4:
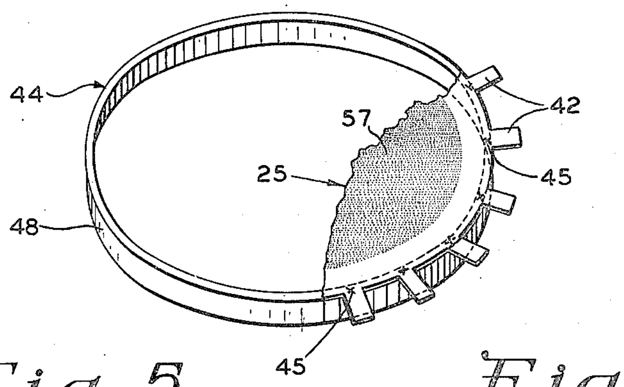
Fig. 4 is a perspective view illustrating the first step for mounting the screen upon its carrier ring.
Figure 5:
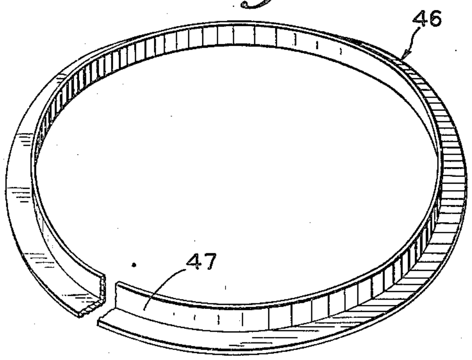
Fig. 5 is a perspective detail of the carrier ring supporting flange with a portion broken away to show the cross-section.
Figure 6:
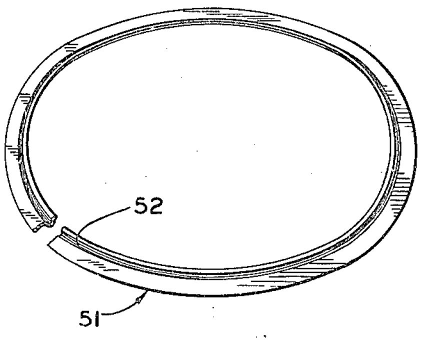
Fig. 6 is a perspective detail of the screen tightening ring with a portion broken away to show the cross-section.

Blank 41 is next provided with a multiplicity of evenly spaced apart apertures or interstices to give a screen effect to the major portion of the blank, or that area of the blank within the confines of circle 43 (Fig. 3). The finer mesh of the screen, the less tendency there is to produce a picture having a grainy appearance. Excellent results have been obtained with a screen having approximately one thousand apertures or holes per inch when the screen is made in accordance with the principles of the present invention.

One successful method employed by us to pierce blank 41 with approximately one thousand perforations or apertures per inch is the well-known photoengraving process. It is to be clearly understood, however, that any other suitable and reliable method may be employed to produce a screen of this mesh having approximately 50% open area. For example, screens suitable for the purpose may be woven of fine wire or they may be made by electrodeposition, similarly to half tone screens in a manner well known to those skilled in this art. However, as above stated, the size of the mesh depends upon the resolution desired and upon the over-all size of the mosaic. We have found by experiment that to produce a screen having a mesh of approximately one thousand apertures per linear inch, the photoengraving process is the most suited from the standpoint of securing accurately spaced apart and uniform perforations. A description of such a process may be found in any of the handbooks on photo engraving such as Handbook of photoengraving by N. S. Amstutz, published by The Inland Printer, Chicago, Illinois; pages 83 to 285.

After perforating the blank by photoengraving methods, it is mounted within a suitable carrier such as that shown in Figs. 4 to 7 respectively in the following manner. The screen is centered over a metal ring 44 (Fig. 4), and then by drawing outwardly upon the tabs 42 to insure flatness of the screen, it may be securely attached to the ring by spot welding the periphery to the ring, as indicated at 45. With the screen 25 thus attached to ring 44, the protruding tabs 42 may be trimmed off prior to inserting mounting ring 46 over ring 44. The upstanding wall 47 of ring 46 may then be securely attached to the outer wall 48 of ring 44 in any suitable manner, as for example, by spot welding numerous places indicated at 50 in Fig. 7.

Figure 7:
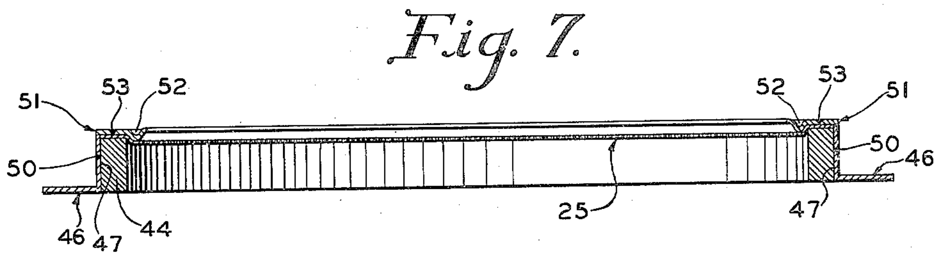
Fig. 7 is a highly enlarged or magnified central cross-section of the finished two-sided mosaic mounted within its carrier.
Figure 8:
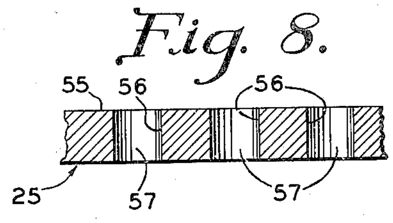
Figure 9:
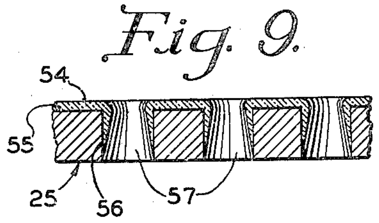

Finally a third ring 51, having a bead 52, is placed on top of screen 25 and ring 44, and sufficient pressure applied to cause the bead to engage the screen to tension the latter until it is taut and substantially flat. Ring 51 is then united with ring 44 and screen 25 by a series of spot welds indicated at 53 (Fig. 7).

After the screen is thus mounted in its carrier ring, it is thoroughly cleaned to remove any resist or other undesirable matter deposited during the photoengraving process in the following manner.

The screen is first wetted with a suitable solvent such as methyl alcohol ($CH_3OH$) in a suitable dish. It is then transferred to 1–1 hydrochloric acid (HCl) where it is left for approximately 5 to 15 minutes to remove the corrosion products. From the hydrochloric acid the screen is transferred to a wash water, and then to a concentrated bath of sodium hydroxide (NaOH), or a dilute bath of sodium cyanide (NaCH) or to a combination of the two. The screen is next rinsed in distilled water, again dipped momentarily in fresh 1–1 hydrochloric acid, and finally thoroughly rinsed in distilled water.

*Insulating coating*

The insulating coating used depends greatly upon its properties in vacuum, and its ease of proper application. Experiments have shown that calcium fluoride ($CaF_2$) successfully meets both of these requirements when it is applied by evaporation in a vacuum of the order $5\times10^{-5}$mm., but it is entirely possible that some other insulator, such as enamel, applied wet in some suitable manner, and then dried and fired, could be used in place of the calcium fluoride coating.

Assuming that calcium fluoride is the chosen insulating material, the procedure for its application to the screen 25 will now be described. The screen is placed in a vacuum system provided with means for the evaporation of calcium fluoride. The source should be placed about three inches from the screen for best results. A shorter distance will cause too much to be condensed on the screen, as well as increase the opportunity for spattering, while a greater distance will not deposit enough calcium fluoride. The source consists of a tungsten, or tantalum-tungsten filament powered by either A. C. or D. C., on which is tied, with fine platinum wire, a small brickette of calcium fluoride abcut ¼″ x ⅛″ x ⅛″, previously fused in hydrogen. This calcium fluoride insulating coating is indicated at 54 in Fig. 9, and it will be noted that said coating 54 not only covers the exposed surface 55 of one side of the screen, but is angularly built up on the wall 56 of each aperture or hole 57 in the screen, due to the fact that in a vacuum vapors travel in a straight line, as well known to those skilled in the art of evaporation.

*Protective barrier*

Figure 10:
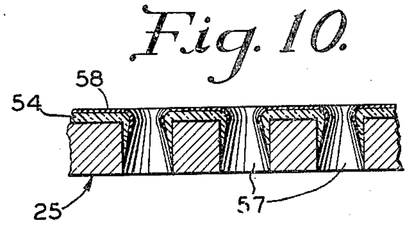

After the screen is coated with insulating material 54, the next step comprises applying, by evaporation, a protective barrier 58, such as aluminum or the like, upon said insulating coating, as clearly shown in Fig. 10. This is accomplished by placing the screen in a vacuum system provided with means for evaporating aluminum. A .025″ tungsten coil of three or four ½″ turns with as large a bead of aluminum as each loop of the coil will safely hold, placed at a distance of approximately 6″ from the screen, will suffice. Care should be taken to protect the reverse side of the screen from the evaporating aluminum, and this may be accomplished by covering it with a sheet of mica or metal.

*Insertion of plugs*

Up to this point, the screen has been supplied with an insulating coating 54 of calcium fluoride on top of which has been applied a protective barrier 58 of aluminum. The aluminized side of the screen is now painted directly with colloidal graphite by means of a small sable brush or by spraying until one end of each aperture 57 is plugged or capped, as clearly illustrated in Fig. 11. One form of colloidal graphite found satisfactory for this use is sold on the market under the trade name "dixonac." The colloidal graphite as it comes from the manufacturer is then diluted with distilled water (about two parts by weight colloidal graphite to one part by weight or less of water so that it has the consistency of a thin paste when brushed on, or slightly thinner consistency for application by spraying) together with about 5% glycerine. The glycerine serves two purposes, the first of which is to prevent cracking of the colloidal graphite coating on drying (as might occur without glycerine), and secondly the glycerine greatly facilitates the removal of the colloidal graphite later in the procedure. Care should be exercised to prevent forcing the colloidal graphite through the holes 57 and to insure that the coating is uniform and complete. This may be checked by holding the screen to the light, and if light shows through the screen, it is not properly or thoroughly coated.

Figure 11:
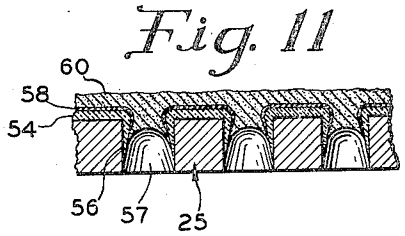

By a study of Fig. 11, it will be observed that colloidal graphite coating 60 is prevented from coming into direct contact with the calcium fluoride insulating coating 54 by the aluminum barrier 58, since it would be very difficult, if not impossible, to later remove the unwanted portions of colloidal graphite from the calcium fluoride insulator. Colloidal graphite has the property of emitting many secondary electrons when bombarded with fast primary electrons.

*Binder*

Figure 12:
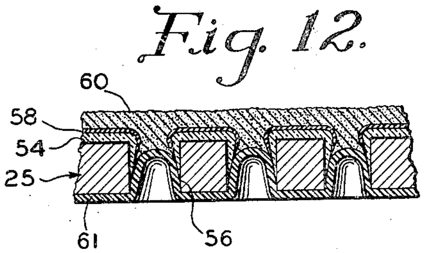

As shown in Fig. 12, a lacquer coating 61 is now applied to the reverse side of the screen, or the side opposite that upon which the calcium fluoride 54 is applied. The lacquer coating 61 is preferably applied to the screen by spraying, and that portion of the lacquer coating which enters the holes 57 and comes into contact with the colloidal graphite plugs 27 will permeate the relatively coarse and spongy plugs to some extent and securely anchor them within the apertures or holes 57, and the plugs being physically so small, danger of removing them by jarring is highly improbable.

Figure 13:
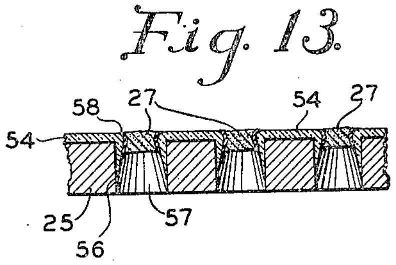

After the lacquer coating 61 has dried the major portion of colloidal graphite coating 60 is removed from the aluminum barrier 58 except the plug portions 27 lodged between the reduced end of each individual aperture 57, as clearly shown in Fig. 13. Removal of the unwanted portion of the colloidal graphite coating is preferably accomplished by carefully washing and scrubbing (with a camel's hair brush in a water bath) in a manner not to disturb the plug portions 27. The aluminum barrier coating 58 previously applied upon the insulating coating 54 may now be removed by careful washing in a sodium hydroxide bath, and as soon as the removal of the aluminum is complete, the screen is gently and thoroughly washed in distilled water.

Lacquer coating 61 is now removed by any suitable solvent such as acetone which will not disturb the plugs 27 of colloidal graphite lodged in the apertures 57. At this point, the plugs 27, in holes or apertures 57, will appear as indicated in the highly magnified view illustrated in Fig. 13, and from this figure, it will be noted that a slight portion of the aluminum barrier 58 still remains between the plugs 27 and the insulating coating 54.

The finished mosaic is now baked for approximately 20 minutes in an atmosphere of $O_2$ at a pressure of 20 mm. and at a temperature of 350° C., then further baked and vacuumed for 10 minutes. After this last period of baking, the mosaic is then complete and the colloidal graphite plugs 27 are finally anchored within the holes 57 and insulated not only from the screen but from each other.

While we have shown and described a particular embodiment of our invention it will be apparent to those skilled in the art that numerous modifications and variations may be made in the form and construction thereof, without departing from the more fundamental principles of the invention. We therefore desire, by the following claims, to include within the scope of our invention all such similar and modified forms of the apparatus disclosed, by which substantially the results of the invention may be obtained by substantially the same or equivalent means.

Having thus described our invention what we claim as new and desire to secure by Letters Patent is:

1. In a television pickup device, a mosaic screen of conductive material pierced with holes, the wall of each hole coated with calcium fluoride, a thin film forming a protective barrier over the calcium fluoride and a plug of colloidal graphite in each hole insulated from the conducting sheet and the other plugs.

2. In a television pickup device, a mosaic screen of conductive material pierced with holes, the wall of each hole coated with calcium fluoride, a thin film of aluminum forming a protective barrier over the calcium fluoride and plug of colloidal graphite in each hole insulated from the conducting sheet and other plugs.

3. In a television pickup device, a mosaic screen of conductive material of circular shape with radial tabs, the center portion pierced with holes, the wall of each hole coated with an insulating material, the remainder of each hole filled with a conducting material and said screen mounted in a flanged ring by welding the radial tabs to the ring.

4. The method of making a mosaic screen for use in a television pickup device of the electron image type which includes the steps of piercing a thin sheet of conducting material with a mesh of holes of the order of a thousand to the linear inch, mounting the screen on a frame, depositing a coating of calcium fluoride on the walls of the holes in the conducting sheet, depositing a thin coating of metal over the calcium fluoride only and depositing a plug of colloidal graphite in each hole insulated from the conducting sheet and from all the other plugs.

5. The method of making a two-sided mosaic which includes the steps of blanking a disk from a thin metallic sheet; perforating said disk to form a screen; mounting the screen in a carrier under tension so that it remains substantially flat; coating one surface of the screen and the wall of each perforation with an insulating material; depositing a protective barrier on top of said insulating coating; depositing a film of conductive material upon said protective barrier to form plugs in each perforation; coating the reverse side of said screen with an adhesive material to hold said plugs with said perforations; removing all excess conducting material and protective barrier from the screen except the plugs of conducting material; removing the adhesive; and finally baking said screen to remove all traces of organic material harmful in the operation of the mosaic.

6. The method of making a two-sided mosaic which includes the steps of blanking a disk from an extremely thin metallic sheet; perforating said disk to form a screen having an open area of at least 50%; mounting the screen in a carrier under tension so that it remains substantially flat; coating one surface of the screen and the wall of each perforation with an insulating material in a manner such that the insulating coating will be angularly deposited or built up on the wall of each perforation; applying a protective barrier on top of said insulating coating; coating a solution of conducting material such as colloidal graphite upon said protective barrier so that one end of each perforation is closed by plugs of said conducting material; coating the reverse surface of said screen with an adhesive to hold the plugs in said screen perforations; then removing all excess conducting material and protective barrier coating except the plugs of conducting material embedded in said perforations in a manner so that the plugs are insulated not only from the screen but from each other; removing the adhesive coating and finally baking the screen to remove all traces of organic material harmful in the operation of the mosaic.

7. The method of making a two-sided mosaic for use with television equipment and the like including the steps of blanking a circular disk from an extremely thin metallic sheet; perforating said disk to form a screen having at least 50% open area; mounting the screen in a carrier under tension so that it remains substantially flat; coating one surface of the screen and the wall of each perforation with an insulating material by evaporation in a vacuum and in such a manner that said insulating coating will be angularly deposited or built up on the wall of each hole in said screen; applying a protective barrier upon the insulating coating through evaporation; spraying a coating of colloidal graphite on top of said barrier coating in a manner to close one end of each hole with a colloidal graphite plug; applying an adhesive coating such as lacquer to the reverse side of the screen to securely anchor said plugs within said holes; removing all excess colloidal graphite and protective barrier coating except the graphite plugs anchored within the reduced end of said holes in a manner so that the plugs are insulated not only from the screen but from each other; and finally baking the screen to remove all traces of organic material.

8. The method of making a two-sided mosaic for use with television equipment and the like including the steps of blanking a circular disk from an extremely thin metallic sheet; perforating said disk to provide holes spaced approximately a thousand to the linear inch to form a screen having at least 50% open area; mounting the screen in a carrier under tension so that it remains substantially flat; coating one side of the screen thus formed with an insulating material such as calcium fluoride by evaporation in a vacuum and in such a manner that said coating will be angularly built up on the wall of each hole; applying by evaporation, a protective barrier such as aluminum on top of the calcium fluoride coating; spraying a coating of colloidal graphite on top of said protective barrier in such a manner that the reduced end of each hole is closed by a plug of colloidal graphite; coating the reverse surface of said screen with an adhesive such as lacquer in a manner to permeate to some extent said plugs in order to anchor them within the reduced end of the holes in said screen; removing all excess colloidal graphite and protective barrier coating except the colloidal graphite plugs anchored within said holes by said adhesive so that the plugs are insulated not only from the screen but from each other; and finally baking the screen.

9. The method of making a two-sided mosaic for use with television equipment and the like including the steps of blanking a circular disk from a thin metallic sheet with radially extending tabs formed integral with said disk; perforating said disk with approximately a thousand holes per linear inch by a photoengraving process to form a screen having an open area of at least 50%; centering said screen upon a carrier ring and while drawing outwardly on said tabs, uniting the screen with said ring by spot welding the screen to the ring; inserting said first mentioned ring within a mounting ring; uniting said rings to one another by spot welding; then placing a tension ring upon said first mentioned ring and applying pressure to tauten said screen; then uniting said tension ring to said screen and said first mentioned ring by spot welding; coating one side of the screen thus formed with an insulating material; applying a protective barrier on top of said insulating coating; applying a conductive material on top of said protective barrier to form plugs within the holes of said screen; applying an adhesive to the reverse side of said screen and in contact with said plugs to anchor them within one end of said holes; removing all excess conducting material and protective barrier from said screen except said plugs within said holes; and finally baking the screen.

MARSHALL P. WILDER.
ARTHUR J. STEVENS.

REFERENCES CITED

The following references are of record in the file of this patent:

UNITED STATES PATENTS

| Number | Name | Date |
|---|---|---|
| 2,045,984 | Flory | June 30, 1936 |
| 2,146,994 | Schroter et al. | Feb. 14, 1939 |
| 2,179,090 | Holman | Nov. 7, 1939 |
| 2,240,186 | Iams | Apr. 29, 1941 |
| 2,265,365 | Gebauer | Dec. 9, 1941 |
| 2,403,225 | Law | July 2, 1946 |